United States Patent [19]

Gowan

[11] 4,453,587
[45] Jun. 12, 1984

[54] REPLICATION OF HIGH POWER LASER MIRRORS

[75] Inventor: John G. Gowan, London, England

[73] Assignee: The United States of America as represented by the Secretary of the Air Force, Washington, D.C.

[21] Appl. No.: 339,205

[22] Filed: Jan. 13, 1982

[51] Int. Cl.³ ............... B22D 23/00; B22D 29/00
[52] U.S. Cl. ............................ 164/46; 164/131
[58] Field of Search ............... 164/46, 94, 95, 131

[56] References Cited

U.S. PATENT DOCUMENTS

| 3,072,983 | 1/1963 | Brenner et al. | 164/46 |
| 3,139,658 | 7/1964 | Brenner et al. | 164/46 |
| 3,873,191 | 3/1975 | Veret et al. | 350/293 |
| 4,115,177 | 9/1978 | Nelson | 156/245 |
| 4,141,405 | 2/1979 | Spindt | 164/46 |
| 4,330,027 | 5/1982 | Narasimhan | 164/461 |

FOREIGN PATENT DOCUMENTS 1521476 6/1972 Fed. Rep. of Germany ........ 164/46

OTHER PUBLICATIONS

*Fabrication of High-Strength Unsupported Metal Members*, Pickhardt and Smith, Journal of Vacuum Sci. Tech., vol. 14, #3, May/Jun., '77, pp. 823-825.

Primary Examiner—Kuang Y. Lin
Assistant Examiner—Jerold L. Johnson
Attorney, Agent, or Firm—Donald J. Singer; Bobby D. Scearce

[57] ABSTRACT

A method for replicating laser mirror surfaces is described which comprises careful preparation, as, for example, by single point diamond turning, on a master block, of a master surface having the contour corresponding to the desired laser mirror surface, vapor depositing onto the master surface a thin metallic layer, and vapor depositing the laser mirror faceplate material to the desired thickness. The selected master block material has a coefficient of thermal expansion mismatch with that of the deposited faceplate material so that the master block shrinks and separates away from the deposited faceplate upon cooldown from the vapor deposition temperature.

5 Claims, 2 Drawing Figures

REPLICATION OF HIGH POWER LASER MIRRORS

RIGHTS OF THE GOVERNMENT

The invention described herein may be manufactured and used by or for the Government of the United States for all governmental purposes without the payment of any royalty.

BACKGROUND OF THE INVENTION

This invention relates to methods for producing metallic reflective surfaces, such as mirrors, and more particularly to methods of fabricating metallic high energy laser mirrors which may have complex curved surfaces, and to methods for accurately replicating such laser mirrors.

Mirrors for high power lasers are currently fabricated using conventional shaping, grinding, and polishing techniques. Meeting the quality requirements placed on such mirrors suitable for inclusion into laser systems is extremely expensive and time consuming. Many mirror types have complex contours that can only be produced by single point diamond turning. This process requires extremely expensive manufacturing facilities, which will not be capable of turning mirrors in sufficient quantity to meet demand. Further, it is not currently possible to turn the most desirable laser mirror faceplate materials with a diamond turning process.

High power laser systems are becoming increasingly sophisticated with a rapidly expanding range of applications. Concurrent therewith is a demand for quality laser optics which exhibit characteristics of a high quality, low distortion surface at high power. The surface must be easily produced and accurately duplicated in quantity.

A method is disclosed herein for fabricating a laser mirror faceplate, one face of which comprises a quality high energy laser mirror surface. The method comprises replication of the mirror surfaces on a carefully prepared master surface. A faceplate replica fabricated by the method described herein may be conveniently coupled with a heat exchanger and other substructure for support of the laser mirror surface. The present invention is a significant advancement over the prior art in that it provides a method for producing multiple replications of laser mirror faceplates from a single master, thereby substantially reducing the cost and time required to produce the mirror. Optics of up to one meter diameter may be replicated according to the described method.

It is, therefore an object of the present invention to provide an improved method for the fabrication of laser mirrors.

It is a further object of the invention to provide a method for replicating high energy laser mirrors having high quality optical surfaces.

It is yet another object of this invention to provide a method for replicating high quality laser mirrors in quantity.

These and other objects of the present invention, as might occur to one with skill in the field of this invention, will become apparent as the detailed description of specific embodiments thereof proceeds.

SUMMARY OF THE INVENTION

In accordance with the foregoing principles and objects of the present invention, a method for replicating laser mirror surfaces is described which comprises careful preparation, as, for example, by single point diamond turning, on a master block, of a master surface having the contour correspondng to the desired laser mirror surface, vapor depositing onto the master surface a thin metallic layer, and vapor depositing the laser mirror faceplate material to the desired thickness. The selected master block material has a coefficient of thermal expansion mismatch with that of the deposited faceplate material so that the master block shrinks and separates away from the deposited faceplate upon cooldown from the vapor deposition temperature.

DESCRIPTION OF THE DRAWINGS

The present invention will be more clearly understood from the following detailed description of specific embodiments thereof read in conjunction with the accompanying drawings wherein.

DETAILED DESCRIPTION

Figure 1:
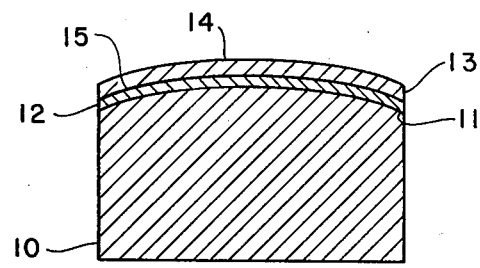
FIG. 1 is a schematic cross section of a representative master replication block having deposited thereon a metallic layer and a laser mirror faceplate.

Referring now to the accompanying drawings, FIG. 1 is a schematic cross-sectional view of a representative embodiment showing a master replication block 10 for depositing a desired laser mirror material on the desired contour. As shown in FIG. 1, master block 10 has a surface 11 machined thereon to the desired contour of the mirror to be formed. Block 10 may be composed of any desirable free cutting material, such as copper, or electroless nickel, which is capable of being machined, diamond turned or otherwise finished. Finished surface 11 of the master provides the surface contour to faceplate 13 according to procedures disclosed herein. Master replication block 10 must be prepared with care to provide numerous replications of the desired mirror surface and may be of any desired diameter, limited only by the capacity of the production equipment. For practical purposes, replication of laser mirrors of up to about 100 cm in diameter may be performed successfully using the methods disclosed herein. The material of which block 10 is composed must withstand the temperatures associated with the vapor deposition of chromium, and the chemical vapor deposition of tungsten, which are contemplated in one or more steps of the methods disclosed.

Laser mirror layer 13, having mirrored surface 15 conforming to the contour of surface 11 of master replication block 10, may then be produced by first depositing a thin, uniform layer 12 of metal onto surface 11 of master block 10 to prevent the subsequently deposited mirror material from adhering to master block 10 during cooldown. Any of several suitable metallic deposits may serve as layer 12. Chromium is the preferred material for layer 12 if tungsten is used to form faceplate 13. Layer 12 should be uniform and less than about 5000 angstroms in thickness, since the sole function thereof is to prevent adherence between layer 13 and block 10, and must not interfere with the conformance of laser mirror surface 15 with the contour of surface 11 on block 10.

The material, such as tungsten, of which the desired laser mirror 13 is composed, is then applied over layer 12 in the form of mirror deposit layer 13 of FIG. 1. CVD is the preferred method for deposition of layer 13. This layer may be applied to any desired thickness, although it was found that about 0.005 to 0.018 inch thickness resulted in suitably reproducible mirrors of tungsten. Since the deposition of tungsten by CVD is performed at about 500° C.–525° C., care must be taken to ensure uniform heating of master block 10 while growing a uniform layer 13. Further, accurate temperature control is highly important to prevent distortion of tungsten layer 13 and to avoid tensioning or compressing tungsten layer 13 by thermal expansion or contraction of block 10 during deposition of the tungsten or a too rapid cooldown which will destroy the optical quality of the faceplate. Other materials for mirror 13 as might be applied herein include tungsten carbide, tantalum, molybdenum, and the like, and are within the scope hereof.

Once deposition of layer 13 to the desired thickness is complete, master block 10, with layers 12 and 13 thereon, is gradually and uniformly cooled. Since block 10 should be composed of materials having a greater coefficient of thermal expansion than that of tungsten layer 13, and since tungsten layer 13 does not adhere strongly to layer 12 of chromium, tungsten layer 13 will separate from master block 10 as it shrinks upon cooling.

When cooled, tungsten mirror layer 13 may easily be lifted from master block 10. Surface 15 of layer 13 comprising the laser mirror surface should not require polishing since surface 15 should have the appropiate finished surface as removed from block 10.

Figure 2:
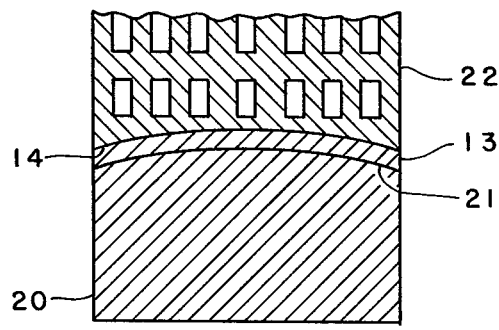
FIG. 2 is a schematic cross section of a representative surrogate block supporting a laser mirror faceplate for attachment thereto of a heat exchanger and other supporting structure.

Once tungsten mirror layer 13 has been produced and separated from master block 10, it may then be transferred to surrogate block 20 as shown in FIG. 2. Surrogate block 20 has a surface 21 having the same contour as surface 11 of master block 10, and serves as a support for mirror layer 13 to maintain its contour during the attachment to back surface 14 thereof of heat exchanger 22 and other supporting structure, such as described in the copending application, entitled "Hot Pressed and Diffusion Bonded Laser Mirror Heat Exchanger", Ser. No. 339,260, filed Jan. 13, 1982, and assigned to the assignee hereof, or the copending application entitled "Laser Mirror and Method of Fabrication", Ser. No. 342,996, filed Jan. 27, 1982, and assigned to the assignee hereof.

Very little should be required to prepare block 10 for repeated CVD processes described above in the production of the replication.

There is, therefore, described herein an improved method for fabrication laser mirror faceplates having accurately reproducible mirror surfaces. It is understood that certain variations of process parameters and materials used in the invention as hereinabove described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

I claim:

1. A method for making a laser mirror faceplate having a mirrored surface of predetermined contour, which comprises the steps of:
   a. providing a master replication block having thereon a smooth surface of contour corresponding to said predetermined contour of said mirrored surface, said block having a first predetermined coefficient of thermal expansion;
   b. vapor depositing a thin metallic first adherent layer on said surface of said block to a uniform predetermined thickness;
   c. vapor depositing at elevated temperature a second layer of faceplate material on said block over said first layer, said faceplate material having a second coefficient of thermal expansion substantially less than said first coefficient of said block to produce a mismatch therebetween;
   d. cooling said block, first layer and second layer, said cooling causing separation of said faceplate material from said block due to said mismatch between said first and second coefficients of thermal expansion of, and the presence of said first layer between, said faceplate material and said block; and
   e. removing said second layer of faceplate material from said block and first layer.

2. The method as recited in claim 1 wherein said replication block comprises a material selected from the group consisting of copper and nickel.

3. The method as recited in claim 1 wherein step b is characterized by vapor depositing chromium as said first adherent layer.

4. The method as recited in claim 1 wherein step b is characterized by vapor depositing said first adherent layer to a thickness less than 5000 angstroms.

5. The method as recited in claim 1 wherein step c is characterized by vapor depositing a second layer comprising a material selected from the group consisting of tungsten, tungsten carbide, tantalum, and molybdenum.

* * * * *